US011887604B1

(12) United States Patent
Pasko

(10) Patent No.: US 11,887,604 B1
(45) Date of Patent: *Jan. 30, 2024

(54) SPEECH INTERFACE DEVICE WITH CACHING COMPONENT

(71) Applicant: Amazon Technologies, Inc., Seattle, WA (US)

(72) Inventor: Stanislaw Ignacy Pasko, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,519

(22) Filed: Sep. 2, 2022

Related U.S. Application Data

(63) Continuation of application No. 17/018,279, filed on Sep. 11, 2020, now Pat. No. 11,437,041, which is a continuation of application No. 15/934,761, filed on Mar. 23, 2018, now Pat. No. 10,777,203.

(51) Int. Cl.
*G10L 15/30* (2013.01)
*H04L 67/5683* (2022.01)
*G10L 15/18* (2013.01)

(52) U.S. Cl.
CPC .............. *G10L 15/30* (2013.01); *G10L 15/18* (2013.01); *H04L 67/5683* (2022.05)

(58) Field of Classification Search
CPC ...... G10L 15/18; G10L 15/32; G10L 15/1815; G10L 15/22; G10L 15/30; G10L 25/51; H04L 67/2857
See application file for complete search history.

(56) References Cited

U.S. PATENT DOCUMENTS

| 6,204,763 | B1 | 3/2001 | Sone |
| 6,226,749 | B1 * | 5/2001 | Carloganu ............. G06F 21/31 726/2 |
| 6,408,272 | B1 * | 6/2002 | White ..................... G10L 15/30 704/270.1 |

(Continued)

OTHER PUBLICATIONS

Office Action for U.S. Appl. No. 15/934,761, dated Feb. 6, 2020, Pasko, "Speech Interface Device With Caching Component", 11 Pages.

(Continued)

*Primary Examiner* — Mohammad K Islam
(74) *Attorney, Agent, or Firm* — Lee & Hayes P.C.

(57) ABSTRACT

A speech interface device is configured to receive response data from a remote speech processing system for responding to user speech. This response data may be enhanced with information such as a remote ASR result(s) and a remote NLU result(s). The response data from the remote speech processing system may include one or more cacheable status indicators associated with the NLU result(s) and/or remote directive data, which indicate whether the remote NLU result(s) and/or the remote directive data are individually cacheable. A caching component of the speech interface device allows for caching at least some of this cacheable remote speech processing information, and using the cached information locally on the speech interface device when responding to user speech in the future. This allows for responding to user speech, even when the speech interface device is unable to communicate with a remote speech processing system over a wide area network.

20 Claims, 8 Drawing Sheets

(56) References Cited

U.S. PATENT DOCUMENTS

| | | | |
|---|---|---|---|
| 6,836,760 B1* | 12/2004 | Bellegarda | G10L 15/1822 704/238 |
| 8,364,694 B2 | 1/2013 | Volkert | |
| 8,515,736 B1* | 8/2013 | Duta | H04M 3/5232 704/9 |
| 8,761,373 B1* | 6/2014 | Raghavan | H04M 3/4936 379/265.03 |
| 8,838,434 B1* | 9/2014 | Liu | G06F 40/58 704/2 |
| 8,983,840 B2* | 3/2015 | Deshmukh | G10L 25/48 704/257 |
| 9,131,369 B2* | 9/2015 | Ganong, III | G10L 15/30 |
| 9,355,110 B1 | 5/2016 | Chi | |
| 9,405,832 B2* | 8/2016 | Edwards | G06F 16/951 |
| 9,484,021 B1* | 11/2016 | Mairesse | G10L 15/02 |
| 9,514,747 B1* | 12/2016 | Bisani | G10L 15/08 |
| 9,558,735 B2 | 1/2017 | Roberts et al. | |
| 9,607,617 B2* | 3/2017 | Hebert | G10L 15/18 |
| 9,619,459 B2* | 4/2017 | Hebert | G06F 16/90332 |
| 9,966,065 B2* | 5/2018 | Gruber | G06F 40/205 |
| 10,018,977 B2* | 7/2018 | Cipollo | G05B 15/02 |
| 10,388,277 B1* | 8/2019 | Ghosh | G10L 15/22 |
| 10,515,637 B1 | 12/2019 | Devries et al. | |
| 10,521,189 B1* | 12/2019 | Ryabov | G06F 40/289 |
| 10,629,186 B1 | 4/2020 | Slifka | |
| 2004/0049389 A1 | 3/2004 | Marko et al. | |
| 2006/0025995 A1* | 2/2006 | Erhart | G10L 15/1822 704/239 |
| 2006/0149544 A1* | 7/2006 | Hakkani-Tur | G10L 15/22 704/236 |
| 2008/0059188 A1 | 3/2008 | Konopka et al. | |
| 2008/0189390 A1 | 8/2008 | Heller et al. | |
| 2009/0030697 A1 | 1/2009 | Cerra et al. | |
| 2009/0030698 A1 | 1/2009 | Cerra et al. | |
| 2010/0088100 A1 | 4/2010 | Lindahl | |
| 2010/0169075 A1 | 7/2010 | Raffa et al. | |
| 2010/0268536 A1* | 10/2010 | Suendermann | G10L 15/1815 704/243 |
| 2010/0332234 A1* | 12/2010 | Agapi | G10L 15/22 704/275 |
| 2011/0038613 A1 | 2/2011 | Buchheit | |
| 2011/0066634 A1 | 3/2011 | Phillips et al. | |
| 2013/0007208 A1 | 1/2013 | Tsui et al. | |
| 2013/0085586 A1 | 4/2013 | Parekh | |
| 2013/0151250 A1* | 6/2013 | VanBlon | G10L 15/30 704/235 |
| 2013/0159000 A1* | 6/2013 | Ju | G10L 15/1822 704/254 |
| 2013/0173765 A1 | 7/2013 | Korbecki | |
| 2013/0326353 A1* | 12/2013 | Singhal | G06F 3/167 715/728 |
| 2014/0019573 A1 | 1/2014 | Swift | |
| 2014/0039899 A1* | 2/2014 | Cross, Jr. | G10L 21/06 704/275 |
| 2014/0046876 A1 | 2/2014 | Zhang et al. | |
| 2014/0058732 A1* | 2/2014 | Labsky | G10L 15/30 704/254 |
| 2014/0207442 A1* | 7/2014 | Ganong, III | G10L 15/30 704/201 |
| 2014/0274203 A1 | 9/2014 | Ganong, III et al. | |
| 2015/0012271 A1* | 1/2015 | Peng | G10L 15/08 704/235 |
| 2015/0120288 A1* | 4/2015 | Thomson | G10L 15/22 704/231 |
| 2015/0120296 A1* | 4/2015 | Stern | G10L 15/30 704/236 |
| 2015/0134334 A1 | 5/2015 | Sachidanandam et al. | |
| 2015/0199967 A1 | 7/2015 | Reddy et al. | |
| 2015/0279352 A1* | 10/2015 | Willett | G10L 19/0017 704/231 |
| 2015/0348548 A1* | 12/2015 | Piernot | G10L 15/26 704/235 |
| 2016/0012819 A1* | 1/2016 | Willett | G10L 15/14 704/233 |
| 2016/0098998 A1 | 4/2016 | Wang et al. | |
| 2016/0103652 A1 | 4/2016 | Kuniansky | |
| 2016/0342383 A1 | 11/2016 | Parekh | |
| 2016/0378747 A1 | 12/2016 | Orr et al. | |
| 2016/0379626 A1* | 12/2016 | Deisher | G10L 15/197 704/232 |
| 2017/0097618 A1* | 4/2017 | Cipollo | G10L 15/22 |
| 2017/0177716 A1* | 6/2017 | Perez | G06F 16/90332 |
| 2017/0213546 A1* | 7/2017 | Gilbert | G06F 40/30 |
| 2017/0236512 A1* | 8/2017 | Williams | H04R 3/12 381/79 |
| 2017/0263253 A1 | 9/2017 | Thomson et al. | |
| 2017/0278511 A1* | 9/2017 | Willett | G10L 25/84 |
| 2017/0278514 A1* | 9/2017 | Mathias | G10L 15/22 |
| 2017/0294184 A1* | 10/2017 | Bradley | G10L 15/04 |
| 2018/0018959 A1* | 1/2018 | Des Jardins | G10L 15/32 |
| 2018/0060326 A1* | 3/2018 | Kuo | G06Q 50/01 |
| 2018/0061403 A1* | 3/2018 | Devaraj | G06F 3/167 |
| 2018/0061404 A1* | 3/2018 | Devaraj | G10L 15/22 |
| 2018/0197545 A1* | 7/2018 | Willett | G10L 15/005 |
| 2018/0211663 A1* | 7/2018 | Shin | G10L 15/1815 |
| 2018/0211668 A1* | 7/2018 | Willett | G10L 15/30 |
| 2018/0233141 A1* | 8/2018 | Solomon | G06K 9/00 |
| 2018/0247065 A1* | 8/2018 | Rhee | G06F 3/167 |
| 2018/0268818 A1* | 9/2018 | Schoenmackers | G10L 15/26 |
| 2018/0294001 A1 | 10/2018 | Kayama | |
| 2018/0314689 A1* | 11/2018 | Wang | G10L 15/07 |
| 2018/0330728 A1* | 11/2018 | Gruenstein | G10L 15/26 |
| 2019/0027147 A1* | 1/2019 | Diamant | G06F 16/3329 |
| 2019/0042539 A1 | 2/2019 | Kalsi et al. | |
| 2019/0043509 A1* | 2/2019 | Suppappola | G10L 17/00 |
| 2019/0043529 A1* | 2/2019 | Muchlinski | G10L 25/84 |
| 2019/0057693 A1* | 2/2019 | Fry | G10L 15/1815 |
| 2019/0103101 A1* | 4/2019 | Danila | G10L 15/22 |
| 2019/0295552 A1* | 9/2019 | Pasko | G06F 3/167 |
| 2019/0371307 A1* | 12/2019 | Zhao | G06F 40/174 |
| 2019/0392836 A1 | 12/2019 | Kang et al. | |
| 2020/0051547 A1 | 2/2020 | Shanmugam et al. | |
| 2020/0410996 A1 | 12/2020 | Brandel et al. | |

OTHER PUBLICATIONS

Office Action for U.S. Appl. No. 17/018,279, dated Dec. 20, 202, Pasko, "Speech Interface Device With Caching Component", 24 pages.

Office Action for U.S. Appl. No. 17/018,279, dated Aug. 18, 2021, Pasko, "Speech Interface Device With Caching Component", 20 pages.

* cited by examiner

SPEECH INTERFACE DEVICE WITH CACHING COMPONENT

CROSS REFERENCE TO RELATED APPLICATION

This application is a continuation of co-pending, commonly owned U.S. patent application Ser. No. 17/018,279, filed on Sep. 11, 2020, which is a continuation of U.S. patent application Ser. No. 15/934,761, filed Mar. 23, 2018, and entitled "SPEECH INTERFACE DEVICE WITH CACHING COMPONENT," now known as U.S. Pat. No. 10,777,203, issued on Sep. 15, 2020, the entirety of which is herein incorporated by reference.

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
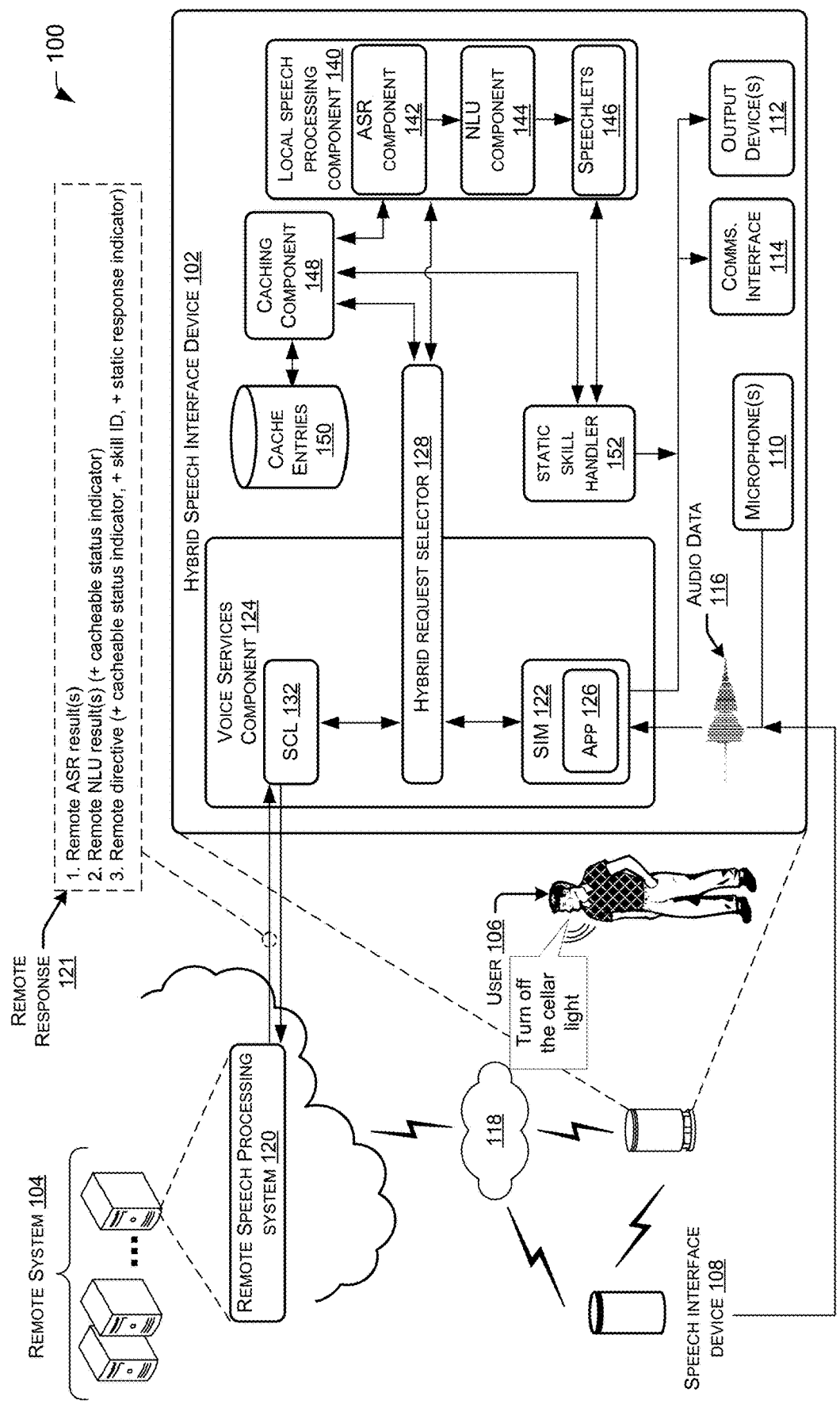
FIG. 1 is a block diagram illustrating a system including a hybrid speech interface device that is capable of caching remote speech processing information to enhance local speech processing on the hybrid speech interface device.

Described herein are, among other things, techniques, devices, and systems, including a speech interface device with a caching component that allows for storing (e.g., caching) remote speech processing information, and using the stored (e.g., cached) information locally on the speech interface device when responding to user speech in the future. The speech interface device is also configured with "hybrid" functionality, which allows the speech interface device to process user speech locally, and to decide whether to respond to user speech using response data from a remote speech processing system, or response data from a local speech processing component. The caching component, in combination with this hybrid functionality, allows the speech interface device to respond to user speech, even in instances when a remote system—which, when available, can be used for processing user speech remotely—is, for example, unavailable to, slower than (with network-related latency factored in), or otherwise less preferred than the speech interface device.

For instance, a speech interface device may reside within an environment (e.g., in a home, automobile, office, hotel, etc.), perhaps along with one or more additional devices (including, for example, other speech interface devices, one or more second devices, such as home automation devices, mobile phone, tablet, TV, wireless speaker, etc.). In a "connected" condition, the speech interface device is able to connect to a remote system over a wide area network so that the remote system can provide speech processing for responding to user speech that occurs locally in the environment. Traditionally, the response data that is received from the remote speech processing system includes directive data that tells the speech interface device how to respond to the user speech. In the disclosed embodiments, this response data from the remote speech processing system may be enhanced with additional information and sent to the speech interface device in real-time while the remote speech processing system is assisting the speech interface device in responding to user speech. For instance, the speech interface device described herein is configured to "listen" for utterances of a user in the environment of the speech interface device, and/or receive audio data from other speech interface devices in the environment that detect such utterances. In either case, when a remote speech processing component is available to the speech interface device, the speech interface device may send the audio data to the remote speech processing component, and may receive response data therefrom. The response data received from the remote speech processing system—in addition to including remote directive data—is enhanced with a remote ASR result(s) (e.g., remote ASR data, such as text data corresponding to the audio data), and a remote NLU result(s) (e.g., remote NLU data, such as intent data and/or slot data corresponding to the remote ASR result). In some embodiments, the response data from the remote speech processing system may include one or more cacheable status indicators associated with the NLU result(s) and/or the remote directive data, which indicate whether the remote NLU result(s) and/or the remote directive data are individually cacheable. The speech interface device can then determine whether to store (e.g., cache) at least some of this information. After storing (e.g., caching) the information on the speech interface device, the speech interface device can use the stored information to respond to user speech in the future without receiving data, or by receiving less data, from the remote speech processing system.

In order to determine whether to store (e.g., cache) any of the remote information, the speech interface device may leverage its "hybrid" capabilities to process user speech locally on the speech interface device, and may then compare the local ASR and NLU results to the remote ASR and NLU results it receives from the remote speech processing system. If the speech interface device detects an ASR-level difference based on this comparison, the local speech processing component of the speech interface device may perform NLU processing on the remote ASR result in an attempt to generate the same NLU result locally. In this scenario, if a second local NLU result (based on the remote ASR result) matches the remote NLU result, the speech interface device may store the remote ASR result in local memory, along with association data that associates the remote ASR result with the first (original) local ASR result. At some later point in time, if the user utters the same expression, the local speech processing component may retrieve the remote ASR result from local memory, and may perform NLU processing on the retrieved remote ASR result using its local speech processing component in order to respond to the user speech. Not only does this allow the speech interface device to respond to user speech in instances when the Internet is down, and/or when a remote system cannot otherwise be reached, but it allows the speech interface device to do so with improved accuracy and/or enhanced functionality, as compared to an accuracy that is achievable when relying exclusively on a local speech processing component to generate ASR and NLU results. To illustrate, consider a case where a storm causes the Internet to go down, and the remote system is unavailable to the speech interface device. In this scenario, if a user utters the expression "Turn off the cellar light," the local ASR component may generate "Turn off the seller light" as the local ASR result, where the word "cellar" is misspelled. However, assuming a remote ASR result is already stored in local memory and associated with this local ASR result, the speech interface device may nevertheless respond correctly to the utterance "Turn off the cellar light" by processing the retrieved remote ASR result through the local NLU component, causing the speech interface device to send the appropriate "turn off" command to a light in the cellar of the user's house.

In some cases, a NLU-level difference may be detected despite local and remote ASR results that match. When the local and remote ASR results match, but the NLU results differ, the speech interface device may store the remote NLU result that was received from the remote speech processing system in local memory (assuming the remote NLU result is cacheable), along with association data that associates the remote NLU result with the first (original) local ASR result. At some later point in time, if the user utters the same expression, the local speech processing component may retrieve the remote NLU result from local memory, and perform an action based at least in part on the retrieved remote NLU result. To illustrate, consider a case where a user is driving in an automobile that is also a speech interface device, and that the user is driving through a remote geographical area without connectivity to a remote speech processing system. In this scenario, if the user utters the expression "Take me home now," the local speech processing component may not be able to resolve the intent of this utterance (e.g., a local NLU failure) due to the word "now" being incorrectly interpreted as part of the destination location. However, assuming a remote NLU result (e.g., intent data) is stored in local memory and associated with the ASR text: "Take me home now," the speech interface device may nevertheless respond correctly to this utterance by executing the retrieved remote NLU result in order to navigate the user to his/her home address.

FIG. 1 is a block diagram illustrating a system 100 including a hybrid speech interface device 102 (often shortened herein to "speech interface device 102") that is capable of storing (e.g., caching) remote speech processing information received from a remote system 104. This caching allows for enhancing local speech processing on the speech interface device 102, which is enabled by the speech interface device's 102 "hybrid" capabilities. The speech interface device 102 may be located within an environment to provide various capabilities to a user 106, when the user 106 is also in the environment. The environment in which the speech interface device 102 is located may be a home or other premises, an automobile, or any similar environment. Such an environment may include other devices including additional speech interface devices, such as the speech interface device 108, and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 110, and responding in various ways, such as by outputting content via an output device(s) 112, which may be a speaker(s), a display(s), or any other suitable output device 112. In addition, the speech interface device 102 may be configured to respond to user speech by controlling second devices that are collocated in the environment with the speech interface device 102, such as by sending a command to a second device via a communications interface 114 (e.g., a short range radio), the command instructing an operation to be performed at the second device (e.g., to turn on a light in the environment). FIG. 1 also shows that, in addition to using the microphone(s) 110 to capture utterances as audio data 116, the speech interface device 102 may additionally, or alternatively, receive audio data 116 (e.g., via the communications interface 114) from another speech interface device 108 in the environment, such as when the other speech interface device 108 captures an utterance from the user 106 and sends the audio data 116 to the speech interface device 102. This may occur in situations where the other speech interface device 108 would like to leverage the "hybrid" capabilities of the speech interface device 102.

As mentioned, under normal conditions, the speech interface device 102 may operate in conjunction with and/or under the control of a remote, network-based or network-accessible control system 104 (abbreviated to "remote system" 104 in FIG. 1). The remote system 104 may, in some instances be part of a network-accessible computing platform that is maintained and accessible via a wide area network 118. Network-accessible computing platforms such as this may be referred to using terms such as "on-demand computing", "software as a service (SaaS)", "platform computing", "network-accessible platform", "cloud services", "data centers", and so forth. The remote system 104 may be configured to provide particular functionality to large numbers of local (e.g., in-home, in-car, etc.) devices of different users.

In some embodiments, the remote system 104 may be configured to receive audio data 116 from the speech interface device 102, to recognize speech in the received audio data 116 using a remote speech processing system 120, and to perform functions in response to the recognized speech. In some embodiments, these functions involve sending directives, from the remote system 104, to the speech interface device 102 to cause the speech interface device 102 to perform an action, such as output an audible response to the user speech via a speaker(s) (i.e., an output device(s) 112), and/or control second devices in the environment by sending a control command via the communications interface 114. Thus, under normal conditions, when the speech interface device 102 is able to communicate with the remote system 104 over a wide area network 118 (e.g., the Internet), some or all of the functions capable of being performed by the remote system 104 may be performed by sending a directive(s) over the wide area network 118 to the speech interface device 102, which, in turn, may process the directive(s) for performing an action(s). For example, the remote system 104, using a remote directive that is included in a remote response 121 (e.g., response data), may instruct the speech interface device 102 to output an audible response (e.g., using text-to-speech (TTS)) to a user's question, to output content (e.g., music) via a speaker of the speech interface device 102, and/or to turn on a light in the environment. It is to be appreciated that the remote system 104 may be configured to provide other functions in addition to those discussed herein, such as, without limitation, providing step-by-step directions for navigating from an origin to a destination location, conducting an electronic commerce transaction on behalf of the user 106 as part of a shopping function, establishing a communication session between the user 106 and another user, and so on.

A home automation example is shown in FIG. 1 by the user 106 uttering the expression "Turn off the cellar light." Whether this utterance is captured by the microphone(s) 110 of the speech interface device 102 or captured by another speech interface device 108 in the environment, the audio data 116 representing this user's speech is ultimately received by a speech interaction manager (SIM) 122 of a voice services component 124 executing on the speech interface device 102. The SIM 122 may manage received audio data 116 by processing utterances as events, and the SIM 122 may also manage the processing of directives that are used to respond to the user speech (e.g., by controlling the action(s) of the speech interface device 102). The SIM 122 may include one or more client applications 126 or skills for performing various functions at the speech interface device 102.

A hybrid request selector 128 (or, hybrid request selector component 128) is shown as a component of the speech interface device 102 in FIG. 1. At least part of (e.g., subcomponents of) the hybrid request selector 128 can be implemented as a layer within the voice services component 124 that is located between the SIM 122 and a speech communication library (SCL) 132, and may be configured to proxy traffic to/from the remote system 104. For example, the hybrid request selector 128 may be configured to pass messages between the SIM 122 and the SCL 132 (such as by passing events and directives there between), and to send messages to/from subcomponents of the hybrid request selector 128 that are configured to select a response (e.g., either local or remote response data) to use in responding to user speech. In this manner, the hybrid request selector 128 can "snoop" on communication between the SIM 122 and the remote system 104. For instance, information (e.g., a remote directive, a capability indicator, etc.) that is contained in the remote response 121 can be sent to the hybrid request selector 128. The hybrid request selector 128 may also be configured to allow audio data 116 received from the SIM 122 to pass through to the remote speech processing system 120 (via the SCL 132) while also receiving (e.g., intercepting) this audio data 116 for input to a local speech processing component 140.

The local speech processing component 140 is configured to process audio data 116 representing user speech. In some embodiments, the hybrid request selector 128 may further control the execution of the local speech processing component 140, such as by sending "execute" and "terminate" events/instructions to the local speech processing component 140. An "execute" event may instruct the local speech processing component 140 to continue any suspended execution based on audio data 116 (e.g., by instructing the local speech processing component 140 to execute on a previously-determined intent in order to generate a directive). Meanwhile, a "terminate" event may instruct the local speech processing component 140 to terminate further execution based on the audio data 116, such as when the speech interface device 102 receives directive data from the remote system 104 and chooses to use that remotely-generated directive data.

In the example of FIG. 1, where the user 106 utters the expression "Turn off the cellar light," the audio data 116 is received by the SIM 122 of the voice services component 124. The SIM 122 may send the audio data 116 through the hybrid request selector 128, which allows the audio data 116 to pass through to the SCL 132, and the SCL 132, in turn, sends the audio data 116 over the wide area network 118 to the remote system 104 for processing speech remotely. The wide area network 118 is representative of any type of public or private, wide-area network, such as the Internet, which extends beyond the environment of the speech interface device 102. Thus, the wide area network 118 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The hybrid request selector 128 may also receive the audio data 116 and input the audio data 116 to the local speech processing component 140. At this point, the hybrid request selector 128 may wait for response data from either or both of the remote system 104 or the local speech processing component 140.

The local speech processing component 140 is configured to receive the audio data 116 from the hybrid request selector 128 as input, to recognize speech in the audio data 116, to determine user intent from the recognized speech, and to determine how to act on the user intent by generating directive data. In some cases, a directive may include a description of the intent (e.g., an intent to turn off {device A}). In some cases, a directive may include (e.g., encode) an identifier of a second device, such as the cellar light, and an operation to be performed at the second device.

In some embodiments, the speech interface device 102 may be configured to compare the audio data 116 to stored models used to detect a wakeword that indicates to the speech interface device 102 that the audio data 116 is to be processed for determining an intent (a local NLU result). In some embodiments, the hybrid request selector 128 may send the audio data 116 to the local speech processing component 140 to have the local speech processing component 140 determine whether a wakeword is detected in the audio data 116, and, if a wakeword is detected, this indication may be provided to the hybrid request selector 128 so that the hybrid request selector 128 can proceed with routing the audio data 116 to the remote speech processing system 120 while the local speech processing component 140 continues processing the audio data 116 in parallel. If the local speech processing component 140 does not detect a wakeword in the audio data 116, this indication may be provided to the hybrid request selector 128 so that the hybrid request selector 128 can refrain from sending the audio data 116 to the remote speech processing system 120, and the local speech processing component 140 may halt further operations after determining that the audio data 116 does not include the wakeword. The audio data 116 can be discarded in this situation.

Among other logical and physical components, the local speech processing component 140 may include an automatic speech recognition (ASR) component 142 that is configured to perform ASR processing on the audio data 116 to convert the audio data 116 into ASR text data (referred to herein as an "ASR result", or "ASR data"). ASR transcribes audio data into text data representing the words of the user speech contained in the audio data 116. A spoken utterance in the audio data can be input to the ASR component 142, which then interprets the utterance based on the similarity between the utterance and pre-established language models available to the local speech processing component 140. For example, the ASR component 142 may compare the input audio data 116 with models for sounds (e.g., subword units or phonemes) and sequences of sounds to identify words that match the sequence of sounds spoken in the utterance of the audio data 116. In some embodiments, the ASR component 142 outputs the most likely text recognized in the audio data 116, or multiple hypotheses in the form of a lattice or an N-best list with individual hypotheses corresponding to confidence scores or other scores (such as probability scores, etc.). In some embodiments, the ASR component 142 is customized to the user 106 (or multiple users) who created a user account to which the speech interface device 102 is registered. For instance, the language models (and other data) used by the ASR component 142 may be based on known information (e.g., preferences) of the user 106, and/or on a history of previous interactions with the user 106.

The local speech processing component 140 may also include a natural language understanding (NLU) component 144 that performs NLU processing on the generated ASR text data to determine intent data and/or slot data (referred to herein as a "NLU result", or "NLU data") so that directives may be determined based on the intent data and/or the slot data. Generally, the NLU component 144 takes textual input (such as processed from the ASR component 142) and attempts to make a semantic interpretation of the ASR text data. That is, the NLU component 144 determines the meaning behind the ASR text data based on the individual words, and then the NLU component 144 can implement that meaning. The NLU component 144 interprets a text string to derive an intent or a desired action or operation from the user 106. This may include deriving pertinent pieces of information in the text that allow the NLU component 114 to identify a second device in the environment, if the user, for example, intends to control a second device (e.g., a light in the user's 106 house, as is the case in the example of FIG. 1). The local speech processing component 140 may also provide a dialog management function to engage in speech dialogue with the user 106 to determine (e.g., clarify) user intents by asking the user 106 for information using speech prompts. In some embodiments, the NLU component 144 is customized to the user 106 (or multiple users) who created a user account to which the speech interface device 102 is registered. For instance, data used by the NLU component 144 to understand the meaning of ASR text may be based on known information (e.g., preferences) of the user 106, and/or on a history of previous interactions with the user 106.

The local speech processing component 140 may also include, or be configured to use, one or more installed speechlets 146. Speechlets 146 may represent domains that are used in order to determine how to act on an utterance in a particular way, such as by outputting a directive that corresponds to the determined intent, and which can be processed to implement the desired operation. Accordingly, the term "speechlet" may be used interchangeably with the term "domain" or "domain implementation." The speechlets 146 installed on the speech interface device 102 may include, without limitation, a music speechlet 146 (or music domain) to act an utterances with intents to play music on a device, such as via a speaker(s) of the speech interface device 102, a navigation speechlet 146 (or a navigation domain) to act on utterances with intents to get directions to a point of interest with a known address, a shopping speechlet 146 (or shopping domain) to act on utterances with intents to buy an item from an electronic marketplace, and/or a device control speechlet 146 (or device control domain) to act on utterances with intents to control a second device(s) in the environment.

In order to generate a particular interpreted response, the NLU component 144 may apply grammar models and lexical information associated with the respective domains or speechlets 146 to recognize one or more entities in the text of the query. In this manner the NLU component 144 may identify "slots" (i.e., particular words in query text) that may be needed for later command processing. Depending on the complexity of the NLU component 144, it may also label each slot with a type of varying levels of specificity (such as noun, place, city, artist name, song name, device name, or the like). Each grammar model used by the NLU component 144 may include the names of entities (i.e., nouns) commonly found in speech about the particular domain (i.e., generic terms), whereas the lexical information (e.g., from a gazetteer) is personalized to the user(s) and/or the device. For instance, a grammar model associated with the navigation domain may include a database of words commonly used when people discuss navigation.

Accordingly, the intents identified by the NLU component 144 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the NLU component 144 may parse the query to identify words as subject, object, verb, preposition, etc., based on grammar rules and/or models, prior to recognizing named entities. The identified verb may be used by the NLU component 144 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 144 may then search the corresponding fields in the domain-specific and personalized lexicon(s), attempting to match words and phrases in the query tagged as a grammatical object or object modifier with those identified in the database(s).

After determining a local NLU result, or failing to do so, the local speech processing component 140 may send response data to the hybrid request selector 128, such as a "ReadyToExecute" response, which indicates that the local speech processing component 140 has recognized an intent, or is ready to communicate failure (if the local speech processing component 140 could not recognize an intent via the NLU component 144). The hybrid request selector 128 may then determine whether to use directive data from the local speech processing component 140 to respond to the user speech, or whether to use directive data received from the remote system 104, assuming a remote response 121 is even received (e.g., when the speech interface device 102 is able to access the remote speech processing system 120 over the wide area network 118).

The local speech processing component 140 may also send local ASR results and local NLU results to a caching component 148. Additionally, the caching component 148 may receive information included in the remote response 121 via the hybrid request selector 128, at least in instances when a remote response 121 is received. Thus, when the speech interface device 102 is in a connected condition, the caching component 148 may possess the local ASR result(s) and the local NLU result(s), as well as information extracted from the remote response 121, which may include at least: one or more remote ASR results, one or more remote NLU results, and one or more directives, along with supplemental information, such as cacheable status indicators, skill ID(s), static response indicators, as will be described in more detail below.

With both local and remote information in its possession, the caching component 148 is configured to determine whether to cache some or all of the cacheable information extracted from the remote response 121 (e.g., response data). Caching logic may be based at least in part on detecting ASR-level differences, and/or detecting NLU-level differences, as well as other factors, as will be described in more detail below. When the caching component 148 determines to do so, it may cache remote speech processing information in local memory of the speech interface device 102 as cache entries 150. These cache entries 150 may include, without limitation, remote ASR results associated with local ASR results, and/or remote NLU results associated with local ASR results, and/or remote directives (including, e.g., static responses) associated with local ASR results, which enables the caching component 148 to retrieve the remote ASR results and/or the remote NLU results (and possibly the remote directive data) in instances where the hybrid request selector 128 determines to use the local speech processing component 140 without reliance on the remote speech processing system 120. For instance, if the cache entries 150 include a correction (e.g., a remote ASR result associated with the local ASR result, and/or a local NLU result associated with the local ASR result), these "corrections" can be retrieved and used in local speech processing, in lieu of generating a local ASR result and/or a local NLU result using the local speech processing component 140.

In some embodiments, a static skill handler 152 (or, static skill handler component 152) may be configured to output static responses that are also cached local memory of the speech interfaced device (e.g., within the cache entries 150). These static responses may include, without limitation, recordings of short songs (e.g., a recording of the Happy Birthday Song sung by a voice assistant personality), or a canned response to a user's question, as spoken by the voice assistant personality. Thus, instead of generating directive data locally for purposes of responding to user speech, the caching component 148, or the static skill handler 152 via the caching component 152, may be configured to retrieve static responses that are output via a static skill handler 152. In this scenario, the SIM 122 may not process directive data, as it typically does, to cause an action to be performed by the speech interface device 102.

The caching-related features described herein allow the speech interface device 102 equipped with local speech processing component 140 to expand and enhance its own, local (e.g., offline) speech processing capabilities by leveraging results produced by the remote speech processing system 120 and received while the speech interface device 102 is in a connected condition. It is a cheap way to implement at least some of the advanced intelligence that may be available to the remote speech processing system 120, and which is not typically available to a resource-constrained device, such as the speech interface device 102.

In some embodiments, the speech interface device 102 may share cached information with other speech interface devices in its environment, such as the speech interface device 108 of FIG. 1. For instance, the speech interface device 102 may send a remote ASR result(s) and/or a remote NLU result(s), and/or remote directive data—along with association data that associates such remote speech processing information with a locally-generated ASR result—to the speech interface device 108. Such transmission of cached information may be sent via a short range wireless protocol (e.g., Bluetooth®), via a local area network (LAN), etc., so that other speech interface devices can benefit from another's cached information. In some embodiments, a speech interface device 102 may selectively share a subset of its cached information with other speech interface devices, such as selecting cached information to share based on domain (e.g., music domain, shopping domain, etc.), based on device capabilities, etc.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
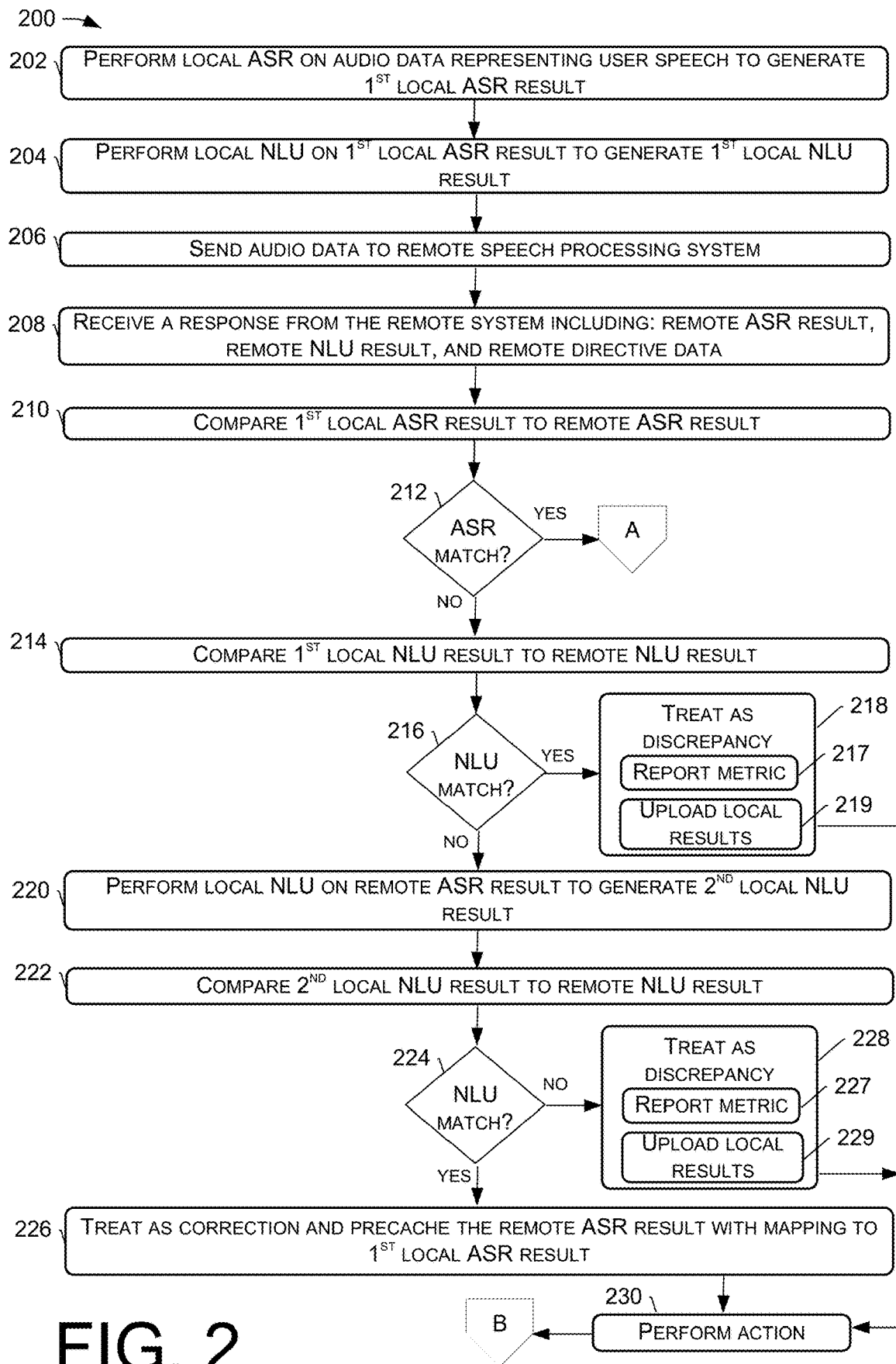
FIG. 2 is a flow diagram of an example process implemented by a hybrid speech interface device for caching remote speech processing information when an automatic speech recognition (ASR)-level difference is detected between a local speech processing component and a remote speech processing component.

FIG. 2 is a flow diagram of an example process 200 implemented by a hybrid speech interface device 102 for caching remote speech processing information when an ASR-level difference is detected between a local speech processing component 140 and a remote speech processing system 120. For discussion purposes, the process 200 is described with reference to FIGS. 1 and 3.

Figure 3:
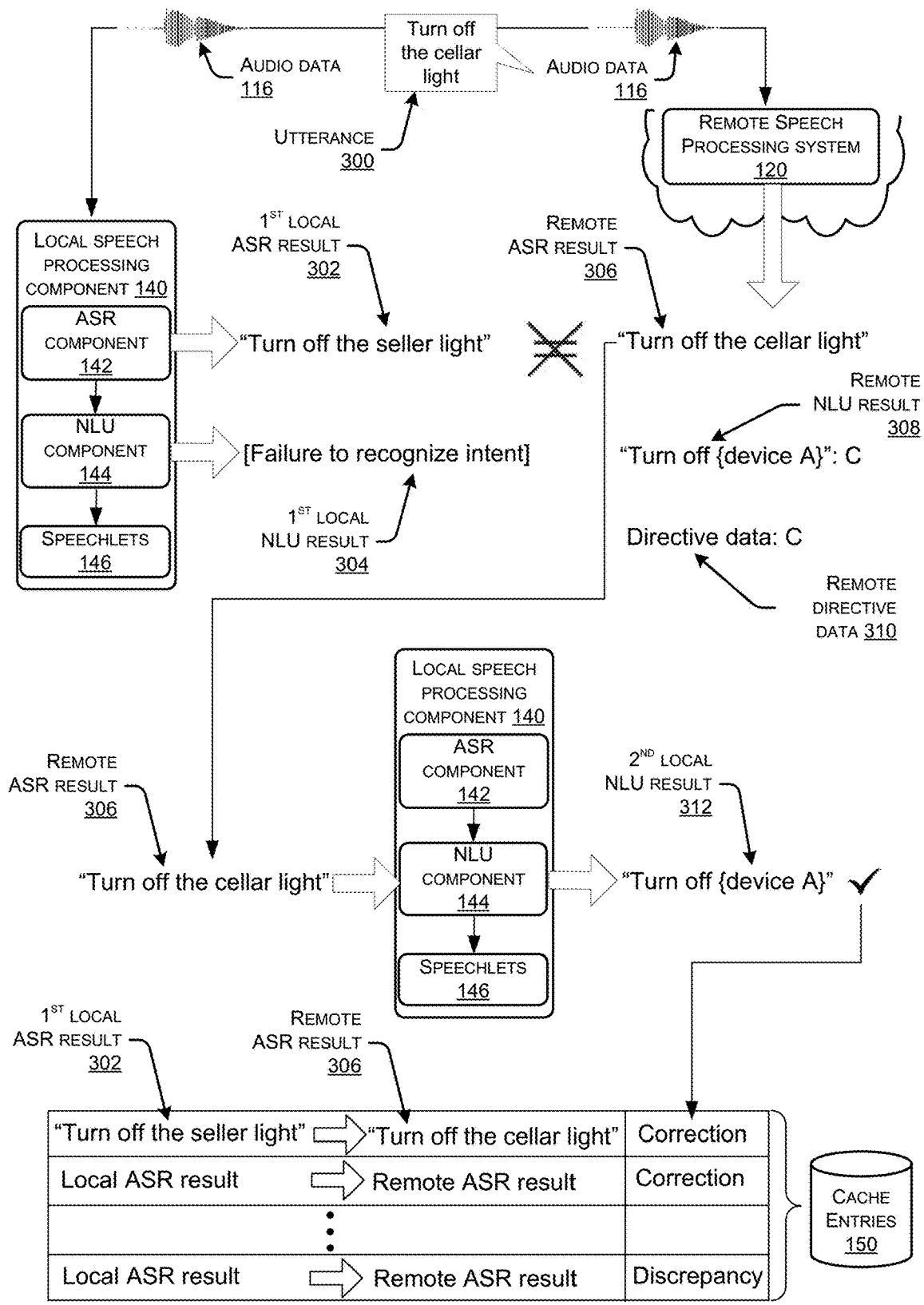
FIG. 3 is a schematic diagram showing example caching logic for an ASR-level difference between a local speech processing component and a remote speech processing component.

At 202, a local speech processing component 140 executing on a speech interface device 102 may perform ASR processing on audio data 116 that represents user speech to generate a first local ASR result. Turning briefly to FIG. 3, an example utterance 300 that might be detected by a speech interface device, such as the speech interface device 102, is shown as the utterance "Turn off the cellar light." FIG. 3 then shows how the operation(s) at block 202 may be performed to generate a first local ASR result 302 (e.g., "Turn off the seller light"). That is, the first local ASR result 302 may be generated by the local ASR component 142 performing ASR processing on the audio data 116 that represents the user speech "Turn off the cellar light." In this case, the local ASR component 142 generated a first local ASR result 302 with the word "cellar" misspelled as "seller."

At 204 of the process 200, the local speech processing component 140 may perform NLU processing on the first local ASR result 302 to generate a first local NLU result. In FIG. 3, an example first local NLU result 304 is shown as a failure to recognize an intent. It is to be appreciated that, if the local NLU component 144 is able to resolve the first local ASR result 302 into an intent, the first local NLU result 304 may be a recognized intent, rather than a failure to recognize an intent. In the illustrative example, the NLU component 144 was unable to resolve the first local ASR result 302 into an intent, so the first local NLU result 304 represents a failure to recognize an intent.

At 206 of the process 200, the speech interface device 102 may send the audio data 116 to a remote speech processing system 120 executing on a remote system 104. The audio data 116 may be send over a wide area network 118 at block 206.

At 208, the speech interface device 102 may receive response data from the remote system 104 (e.g., the remote response 121 of FIG. 1). The remote response 121 received from the remote system 104 may include: a remote ASR result(s) corresponding to the audio data 116, a remote NLU result(s) corresponding to the remote ASR result(s), and remote directive data. This remote response 121 (e.g., response data) can be received by the hybrid request selector 128 and forwarded to the caching component 148 at block 208. FIG. 3 shows examples of a remote ASR result 306, a remote NLU result 308, and remote directive data 310. For example, the remote ASR result 306 might be "Turn off the cellar light" based on the utterance 300, the remote NLU result 308 might be "Turn off {device A}" (where "device A", in this case, may be the text of a resolved slot for a "turn off" intent), and the remote directive data 310 may be generated by the remote speech processing system 120 executing on the remote NLU result 308 (i.e., an intent determined by the remote speech processing system 120). It is to be appreciated that the remote system 104 may send multiple directives related to the processing of the remote NLU result 308. For simplicity, the example of FIG. 3 assumes a single directive, which causes the speech interface device 102 to send a "turn off" command to a light in the user's house.

In some embodiments, the remote ASR result(s) 306 is received as an ASR recognition event, and may include an N-best list of remote ASR results 306. Remote ASR results 306 may be cacheable by default, and may, therefore, omit a cacheable status indicator. In some embodiments, the remote NLU result(s) 308 is received as a NLU recognition event, and may include an N-best list of remote NLU results 308 (e.g., intent resolutions). FIG. 3 shows that the remote NLU result(s) 308 may include, or be associated with, a cacheable status indicator (e.g., "C") to indicate whether the remote NLU result(s) 308 is cacheable; in this case, "C" is to be interpreted as a cacheable status indicator that indicates something is cacheable. In some embodiments, where a NLU result 308 includes resolved (e.g., filled) slots, a cacheable status indicator (e.g., "C") may be associated with each slot to indicate whether the slot itself (and/or the resolved text of the slot) is cacheable. In this scenario, a NLU result 308 may be cacheable if all of its slots are cacheable. A NLU result 308 may be cacheable if the NLU result 308 does not contain slots that may change their interpretation over time. For example, the utterance "what's the weather in Houston" may be resolved into a cacheable remote intent (remote NLU result 308). Remote NLU results 308 for the utterances "what's the time" or "tell me a joke" may be cacheable as well, because their interpretations don't change over time. It is to be appreciated that, although the letter "C" is used to denote a cacheable status indicator herein, a cacheable status indicator may be provided in any suitable form, such as a bit or Boolean value that can be set to "true" to indicate that information is cacheable, or "false" to indicate that information is not cacheable.

The remote directive data 310 may also be associated with a cacheable status indicator (e.g., "C"), which indicates whether the remote directive data 310 is cacheable. Remote directive data 310 may be cacheable if the remote directive data 310 does not change over time. In the example where the user 106 utters the expression "what's the weather in Houston", the remote directive data 310 for that utterance is not cacheable because the weather changes over time, and, therefore, the remote directive data 310 for outputting an appropriate response to the user 106 from the speech interface device 102 will change over time. In the example shown in FIG. 3, the remote directive data 310 (for turning off a light in the cellar) may be cacheable. In some embodiments, the remote directive data 310 may also include a skill identifier (ID) that identifies a remote skill (e.g., an application) that executed on the remote NLU result 308. In some embodiments, the remote directive data 310 may also include a static response indicator to indicate when a "response" (which is to be output from an output device 112 of the speech interface device 102) is static, and, as a result, can be cached for playback on the speech interface device 102. An example of a static response may be a recording of content (e.g., audio and/or video content), such as the Happy Birthday song, which can be cached and subsequently retrieved for playback locally on the speech interface device 102, if needed. Static responses may be retrieved from local memory of the speech interface device 102 and executed by the static skill handler 152.

After block 208 of the process 200, the caching component 148 has access to, among other things, the first local ASR result 302 generated by the local speech processing component 140, and the remote ASR result 306 that was extracted from the remote response 121 received at block 208. It is to be appreciated that the caching component 148, at this point in time, may have access to 1 or more local ASR results 302, 0 or more local intents that are recognized by the local NLU component 144, 1 or more remote ASR results 306, and 0 or more remote intents that are recognized by the remote speech processing system 120. This is because performing NLU processing sometimes results in a failure to recognize an intent, and the NLU results 304/308 may, therefore, represent either a failure to recognize an intent, or a recognized intent.

At 210 of the process 200, the caching component 148 may compare the first local ASR result 302 to the remote ASR result 306. This comparison at block 210 may include selecting and comparing a top ranked (e.g., 1-best) local ASR result 302 to a top ranked (e.g., 1-best) remote ASR result 306.

At 212, the caching component 148 may determine whether, based on the comparison at block 210, the first local ASR result 302 matches the remote ASR result 306. It is to be appreciated that a determination as to whether first ASR text data matches second ASR text data may include determining an approximate text match between the first ASR text data and the second ASR text data. Approximate text matching may include generating a match score and determining whether the match score satisfies (e.g., meets or exceeds) a threshold score. For instance, there may be differences between first ASR text data and second ASR text data for various reasons, such as formatting differences, noise, differences in vocabulary available to the respective ASR components or the like, and a match score can be calculated based on a change metric, such as a number of character and/or word edits to change the first ASR text data into the second ASR text data, or a similar metric. An exact match would not have any character and/or word edits, and, as a result, may receive a highest possible match score. The threshold score may be set at any suitable level below the highest possible match score to allow for first and second ASR text data to be considered "matching", despite one or more differences between the first and second ASR text data. It follows that, first ASR text data may be considered to not match, or differ from, second ASR text data if a match score does not satisfy (e.g., does not meet or exceed) a threshold score.

Figure 4:
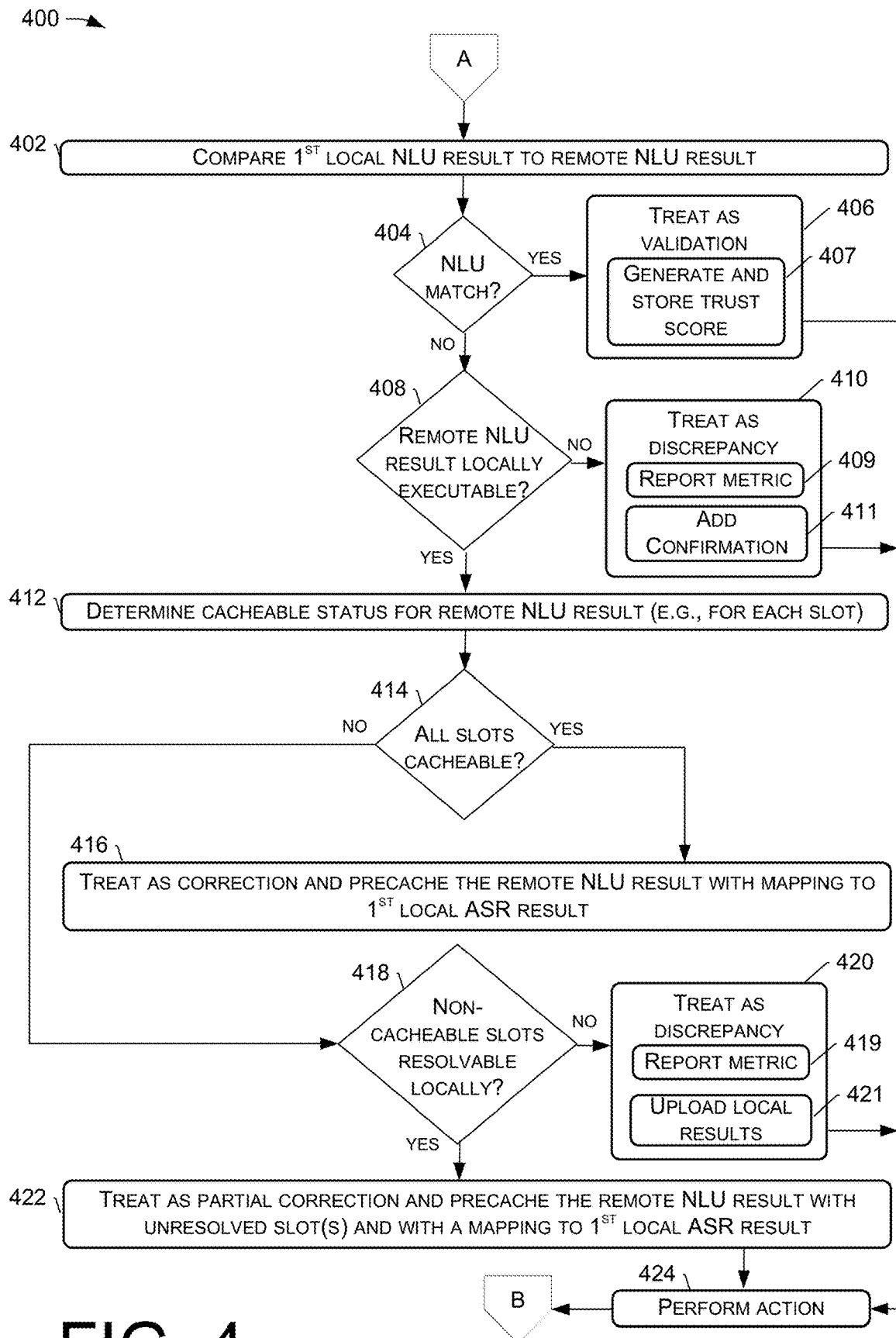
FIG. 4 is a flow diagram of an example process implemented by a hybrid speech interface device for caching remote speech processing information when ASR results match, but a natural language understanding (NLU)-level difference is detected between a local speech processing component and a remote speech processing component.

If the local and remote ASR results match at block 212, the process 200 may follow the "YES" route from block 212 to the off-page reference "A" (which continues in FIG. 4). If the first local ASR result 302 differs from (e.g., does not match) the remote ASR result 306 at block 212, the process 200 may follow the "NO" route from block 212 to block 214. The example of FIG. 3 shows a case where the first local ASR result 302 (e.g., "Turn off the seller light") does not match the remote ASR result (e.g., "Turn off the cellar light") due to the difference in the words "seller" and "cellar", and as such, the process 200 may follow the "NO" route from block 212 for the example shown in FIG. 3.

At 214, the caching component 148 may compare the first local NLU result 304 to the remote NLU result 308. This comparison at block 214 may include selecting and comparing a top ranked (e.g., 1-best) local NLU result 304 to a top ranked (e.g., 1-best) remote NLU result 308. Comparing the local and remote NLU results 304/308 at block 214 may include analyzing the first local NLU result 304 to determine whether the first local NLU result 304 is a failure to recognize an intent. The comparing the local and remote NLU results at block 214 may, additionally or alternatively, include comparing slot resolutions of the local and remote NLU results 304/308.

At 216 of the process 200, the caching component 148 may determine whether, based on the comparison (e.g., analysis of the first local NLU result 304) at block 214, the first local NLU result 304 matches the remote NLU result 308. It is to be appreciated that a determination as to whether first NLU intent data matches second NLU intent data may include determining an approximate text match between the first NLU intent data and the second NLU intent data. Approximate text matching may include generating a match score and determining whether the match score satisfies (e.g., meets or exceeds) a threshold score. For instance, there may be differences between first NLU intent data and second NLU intent data for various reasons, such as formatting differences, differences in intent recognition capabilities, differences in vocabulary available to the respective NLU components, or the like, and a match score can be calculated based on a change metric, such as a number of character and/or word edits to change the first NLU intent data into the second NLU intent data, or a similar metric. An exact match would not have any character and/or word edits, and, as a result, may receive a highest possible match score. The threshold score may be set at any suitable level below the highest possible match score to allow for first and second NLU intent data to be considered "matching", despite one or more differences between the first and second NLU intent data. It follows that, first NLU intent data may be considered to not match, or differ from, second NLU intent data if a match score does not satisfy (e.g., does not meet or exceed) a threshold score. If the local and remote NLU results match each other at block 216, the process 200 may follow the "YES" route from block 216 to block 218.

At 218, when the first local NLU result 304 matches the remote NLU result 308, notwithstanding a difference between the first local ASR result 302 and the remote ASR result 306, the caching component 148 may treat this condition as a discrepancy. As shown by sub-blocks 217 and 219, the caching component 148 may report (sub-block 217) the discrepancy to the remote system 104 as a metric, and may upload (sub-block 219) one or more local results (e.g., the first local ASR result 302 and/or the first local NLU result 304) to the remote system 104. The remote system 104 may use the reported metric and/or the uploaded local result(s) to retrain models (e.g., language models, etc.) used by local speech processing components, such as the local speech processing component 140, in an effort to improve the local speech recognition capabilities of these local components.

If, at block 216, the first local NLU result 304 differs from (e.g., does not match) the remote NLU result 308 (which may include a determination that the first local NLU result 304 represents a failure to recognize an intent), the process 200 may follow the "NO" route from block 216 to block 220. The example of FIG. 3 shows a case where the first local NLU result 304 (e.g., a failure to recognize an intent) does not match the remote NLU result (e.g., "Turn off {device A}").

At 220 of the process 200, when at least one of: (i) the first local NLU result 304 represents a failure to recognize an intent, or (ii) the first local NLU result 304 does not match the remote NLU result 308, the local speech processing component 140 (e.g., the NLU component 144) may perform NLU processing on the remote ASR result 306 in an attempt to generate a second local NLU result 312.

At 222, the caching component 148 may compare the second local NLU result 312 to the remote NLU result 308. Comparing the local and remote NLU results at block 222 may include analyzing the second local NLU result 312 to determine whether the second local NLU result 312 is a failure to recognize an intent. The comparing the local and remote NLU results at block 222 may, additionally or alternatively, include comparing slot resolutions of the local and remote NLU results.

At 224, if the caching component 148 determines that the second local NLU result 312 matches the remote NLU result 308, the process 200 may follow the "YES" route from block 224 to block 226. This case is shown in the example of FIG. 3, where the local NLU component 144 resolved the remote ASR result 306 into a second local NLU result 312: "Turn off {device A}", which is the same as the remote NLU result 308.

At 226, the caching component 148 may treat this condition as a correction, and may cache the remote ASR result 306 by storing, in memory of the speech interface device 102 (e.g., as a cache entry 150): the remote ASR result 306, and association data that associates the remote ASR result 306 with the first local ASR result 302. As noted in FIG. 2, this storing of remote speech processing information in the memory of the speech interface device 102 is sometimes referred to as "precaching," because the cached information is to be retrieved and used in the future, in particular instances. This is shown in the first cache entry of the cache entries 150 depicted in FIG. 3, where the first local ASR result 302 (e.g., "Turn off the seller light") is associated with the remote ASR result 306 (e.g., "Turn off the cellar light"), and is indicated as a correction. In some embodiments, the correction information stored in the local memory may include a trust score associated with the first local ASR result 302. The trust score can be used to determine when to lookup a local ASR result in the cache entries 150 (e.g., when the trust score is less than a threshold score). In some embodiments, the remote directive data 310 (when cacheable) is cached at block 226 as well, and the remote directive data 310 can be associated with the first local ASR result 302. Caching the remote directive data 310 may include caching a static response (e.g., a recording of an audible response, such as a speech byte stream, or content that can be played back using the static skill handler 152). As mentioned, some remote directive data 310 may not be cacheable, so storing the remote directive data 310 may include determining that a cacheable status indicator associated with the remote directive data 310 indicates that the remote directive data 310 is cacheable.

If, at block 224, the caching component 148 determines that the second local NLU result 312 does not match the remote NLU result 308 (which may include a determination that the second local NLU result 312 represents a failure to recognize an intent), the process 200 may follow the "NO" route from block 224 to block 228, where the caching component 148 may treat this condition as a discrepancy. As shown by sub-blocks 227 and 229, the caching component 148 may report (sub-block 227) the discrepancy to the remote system 104 as a metric, and may upload (sub-block 229) one or more local results (e.g., the first local ASR result 302, the first local NLU result 304, and/or the second local NLU result 310) to the remote system 104. The remote system 104 may use the reported metric and/or the uploaded local results to retrain models (e.g., language models, etc.) used by local speech processing components, such as the local speech processing component 140, to improve the speech recognition capabilities of the local components.

At 230, following either a discrepancy condition or a correction condition, the speech interface device 102 may continue to respond to the user speech by performing an action. This action can be based on the remote directive data 310 received from the remote system 104. Alternatively, if the hybrid request selector 128 determines to use locally-generated directive data, the action may be based on locally-generated directive data. In the example of FIG. 3, having received a remote response 121 from the remote system 104, the remote directive data 310 may be used to cause the speech interface device 102 to perform the action, such as outputting content (e.g., audio and/or video content) via an output device 112 of the speech interface device 102, sending a command to a second device collocated in an environment with the speech interface device 102, the command instructing an operation to be performed at the second device (e.g., turn on/off a light), and so on.

In some embodiments, directive data that is generated by a domain/speechlet of the remote speech processing system 120 and/or the local speech processing component 140 may be formatted using Java, such as JavaScript syntax, or JavaScript-based syntax. This may include formatting the directive using JSON. In some embodiments, such a locally-generated directive may be serialized, much like how remotely-generated directives are serialized for transmission in data packets over the wide area network 118. In other embodiments, a locally-generated directive is formatted as a programmatic application programming interface (API) call with a same logical operation as a remotely-generated directive. In other words, a locally-generated directive may mimic remotely-generated directives by using a same, or a similar, format as the remotely-generated directive.

An example structure of a locally-generated directive may include a header object, an endpoint object, and a payload object. The header object may include a set of fields that provide different types of identifying information (sometimes called "properties"). Header properties may include, without limitation, a namespace (e.g., for specifying a category for the message payload, e.g., "SpeechSynthesizer,"), a name (e.g., "Speak"), a message identifier (ID) (e.g., a unique identifier for a single request or response), a correlation token (e.g., to identify a directive, and possibly events associated therewith), a payload version (e.g., version of the capability interface applied to the message), a "keys" section, etc. An endpoint object may identify a target for a directive, and possibly an origin of an event. An endpoint, in this context, can represent a physical device, a virtual device, a group of devices, a software component. The endpoint may include an authentication token to enable communication with a device(s) or component represented by the endpoint. Endpoint properties may include, without limitation, a scope (e.g., a polymorphic object that provides authorization and identifying information for a message, and may include a token that identifies a user), an endpoint ID (e.g., a unique identifier corresponding to the endpoint), and a cookie (e.g., a list of key/value pairs associated with the endpoint).

FIG. 4 is a flow diagram of an example process 400 implemented by a hybrid speech interface device 102 for caching remote speech processing information when ASR results match, but an NLU-level difference is detected between a local speech processing component 140 and a remote speech processing system 120. For discussion purposes, the process 400 is described with reference to the previous figures, and FIG. 5. Furthermore, as shown by the off-page reference "A" in FIGS. 2 and 4, the process 400 may continue from block 212 of FIG. 2, after the caching component 148 determined that a first local ASR result matched a remote ASR result.

Figure 5:
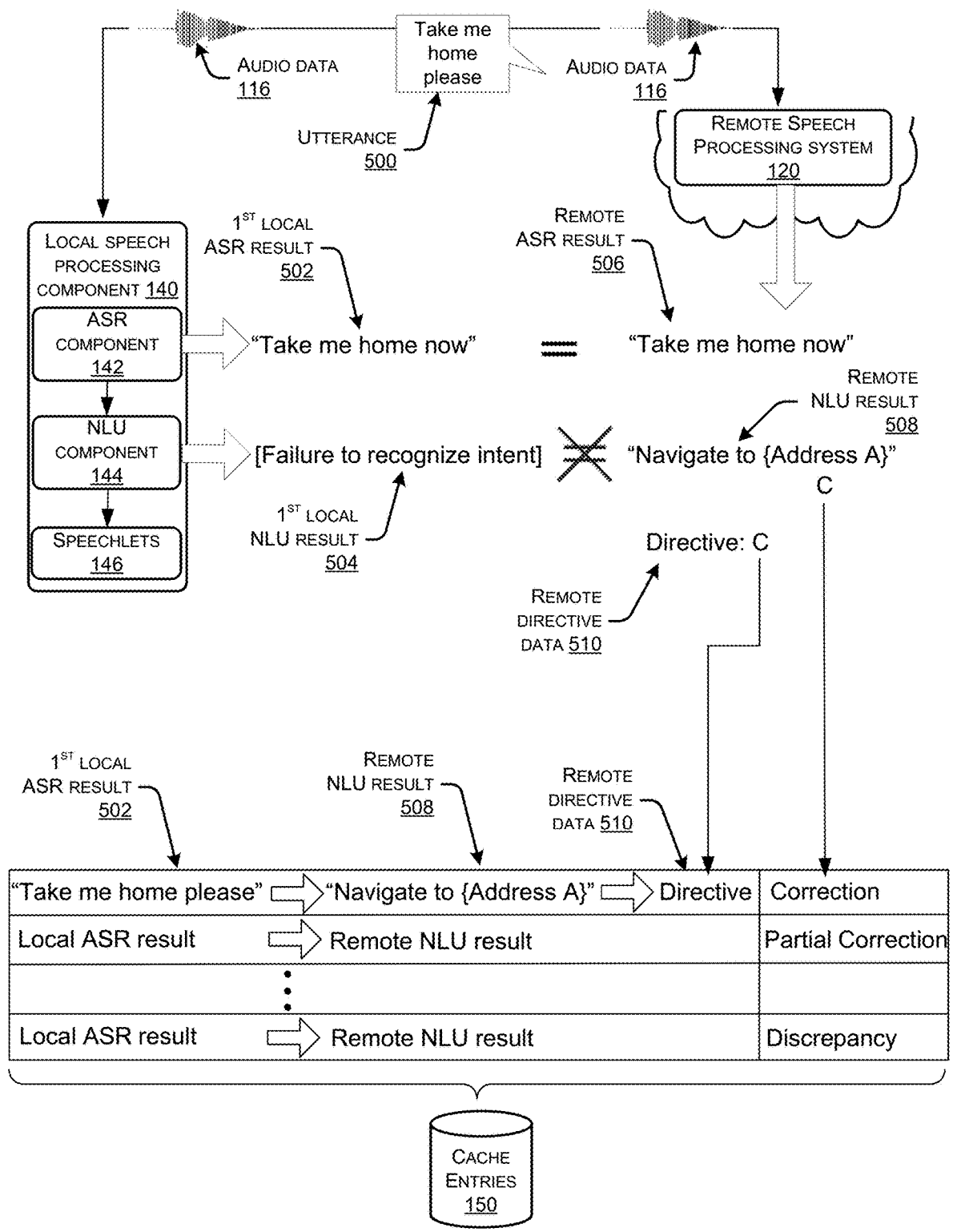
FIG. 5 is a schematic diagram showing example caching logic for a NLU-level difference between a local speech processing component and a remote speech processing component.

Turning briefly to FIG. 5, an example is shown where an NLU-level difference is detected notwithstanding ASR results that match between a local speech processing component 140 and a remote speech processing system 120. For example, an utterance 500 detected by a speech interface device 102 might be "Take me home now," such as when the user 106 is trying to invoke a navigation service by speaking to the speech interface device 102, which may be located in the user's 106 automobile. FIG. 5 shows how a first local ASR result 502 (e.g., "Take me home now") may be generated by the local ASR component 142 performing ASR processing on the audio data 116 that represents this user speech. In this case, the local ASR component 142 generated a first local ASR result 502 that matches a remote ASR result 506, causing the process 200 to follow the "YES" route from block 212 to block 402 via the off-page reference "A" in FIGS. 2 and 4.

At 402 of the process 400, the caching component 148 may compare a first local NLU result to the remote NLU result. In the example of FIG. 5, the first local NLU result 504 represents a failure to recognize an intent, however, the local NLU component 144 may generate a first local NLU result 504 as a recognized intent, in some embodiments. Meanwhile, the remote NLU result 508 of FIG. 5 is a recognized intent (e.g., "Navigate to {Address A}"). Comparing the local and remote NLU results at block 402 may include analyzing the first local NLU result 504 to determine whether the first local NLU result 504 is a failure to recognize an intent. The comparing the local and remote NLU results at block 402 may, additionally or alternatively, include comparing slot resolutions of the local and remote NLU results.

At 404, the caching component 148 may determine whether the first local NLU result 504 matches the remote NLU result 508. If the NLU results match at block 404, the process 400 may follow the "YES" route from block 404 to block 406 where the caching component 148 may treat this condition as a validation. As shown by sub-block 407, the caching component 148 may generate and store a trust score (sub-block 407) associated with either or both of the first local ASR result 502 and/or the first local NLU result 504. A high trust score (e.g., a trust score that meets or exceeds a threshold trust score), for example, can be used in the future to refrain from looking up cache entries 150 the next time the same utterance is detected, because the local speech processing component 140 may respond to the user speech correctly without reliance on any remote results.

If, at block 404, at least one of: (i) the first local NLU result 502 represents a failure to recognize an intent, or (ii) the first local NLU result 502 does not match the remote NLU result 508 (which may include different slot resolutions), the process 400 may follow the "NO" route from block 404 to block 408.

At 408 of the process 400, the caching component 148 may determine whether the remote NLU result 508 is executable using a local speechlet 146 on the speech interface device 102. If the remote NLU result 508 is not executable locally on the speech interface device 102 using a local speechlet 146, the process 400 may follow the "NO" route from block 408 to block 410 where the caching component 148 may treat this condition as a discrepancy. A NLU discrepancy can be handled in various ways. In some embodiments, as shown by sub-block 409, the caching component 148 may report (sub-block 409) the discrepancy to the remote system 104 as a metric. In some embodiments, as shown by sub-block 411, the caching component 148 may add a confirmation step that is to be performed in real-time if an when the first local NLU result 502 is used for responding to the user speech, such as a confirmation step that asks the user 106 if they want to receive a response despite a low confidence intent resolution (e.g., a low confidence first local NLU result 502).

If, at block 408, the caching component 148 determines that the remote NLU result 508 is executable using a local speechlet 146 on the speech interface device 102, the process 400 may follow the "YES" route from block 408 to block 412.

At block 412, the caching component 148 may determine a cacheable status of the remote NLU result 508. Determining the cacheable status of the remote NLU result 508 can include determining the cacheable status of individual slots of the remote NLU result 508, which may be based on a cacheable status indicator associated with the individual slots of the remote NLU result 508. In the example of FIG. 5, the remote NLU result 508 is associated with a cacheable status indicator for at least one slot that indicates the text of the slot (e.g., {Address A}) is cacheable.

At 414 of the process 400, the caching component 148 may determine whether all slots of the remote NLU result 508 are cacheable (e.g., based on a cacheable status indicator associated with individual slots of the remote NLU result 508). If, at block 414, the caching component 148 determines that all slots of the remote NLU result 508 are cacheable, the process 400 may follow the "YES" route from block 414 to block 416, where the caching component 148 may treat this condition as a correction, and may cache the remote NLU result 508 by storing, in memory of the speech interface device 102: the remote NLU result 508, and association data that associates the remote NLU result 508 with the first local ASR result 502. This is shown in the first cache entry of the cache entries 150 in FIG. 5, where the first local ASR result 502 (e.g., "Take me home now") is associated with the remote NLU result 508 (e.g., "Navigate to {Address A}"). In some embodiments, an expiration time may be enacted on the stored remote NLU result 508 to expire the remote NLU result 508 from the cache entries 150 (e.g., remove the remote NLU result 508 from local memory) after a period of time since caching the remote NLU result 508.

If, at block 414, the caching component 148 determines that the text of at least one slot of the remote NLU result 508 is not cacheable, the process 400 may follow the "NO" route from block 414 to block 418 where the caching component 148 may determine whether any non-cacheable slots are resolvable locally. If, at block 418, at least one slot is not resolvable by the local speech processing component 140 performing slot resolution, the process 400 may follow the "NO" route from block 418 to block 420, where the caching component 148 may treat this condition as a discrepancy. As shown by sub-blocks 419 and 421, the caching component 148 may report (sub-block 419) the discrepancy to the remote system 104 as a metric, and may upload (sub-block 421) one or more local results (e.g., the first local ASR result 502 and/or the first local NLU result 504) to the remote system 104. The remote system 104 may use the reported metric and/or the uploaded local results to retrain models (e.g., language models, etc.) used by local speech processing components, such as the local speech processing component 140, to improve the speech recognition capabilities of the local components.

If, at block 418, the slot(s) of the remote NLU result 508 is/are resolvable locally using the local speech processing component 140 performing slot resolution on those slots, the process 400 may follow the "YES" route from block 418 to block 422, where the caching component 148 may treat this condition as a partial correction and may storing the at least one slot that is cacheable, but locally unresolvable, with an unresolved label as part of caching the remote NLU result 508.

At 424, following a validation condition, a discrepancy condition, a correction condition, or a partial correction condition, the speech interface device 102 may continue in its response to the user speech by performing an action. This action can be based on the remote directive data 510 received from the remote system 104. Alternatively, if the hybrid request selector 128 determines to use locally-generated directive data, the action may be based on locally-generated directive data. In the example of FIG. 5, having received a remote response 121 from the remote system 104, the remote directive data 510 may be used to cause the speech interface device 102 to perform the action, such as outputting content (e.g., audio and/or video content) via an output device 112 of the speech interface device 102, sending a command to a second device collocated in an environment with the speech interface device 102, the command instructing an operation to be performed at the second device (e.g., turn on/off a light), and so on.

In some embodiments, the remote directive data 510 (when cacheable) is cached at block 416 or 422 and associated with the first local ASR result 502. This is shown in the first cache entry of the cache entries 150 in FIG. 5 where the first local ASR result 502 is associated with the remote NLU result 508 and to the remote directive data 510. Caching the remote directive data 510 may include caching a static response (e.g., a recording of an audible response, such as a speech byte stream, or content that can be played back using the static skill handler 152). This operation may include determining that a cacheable status indicator (e.g., "C") associated with the remote directive data 510 indicates that the remote directive data 510 is cacheable.

Figure 6:
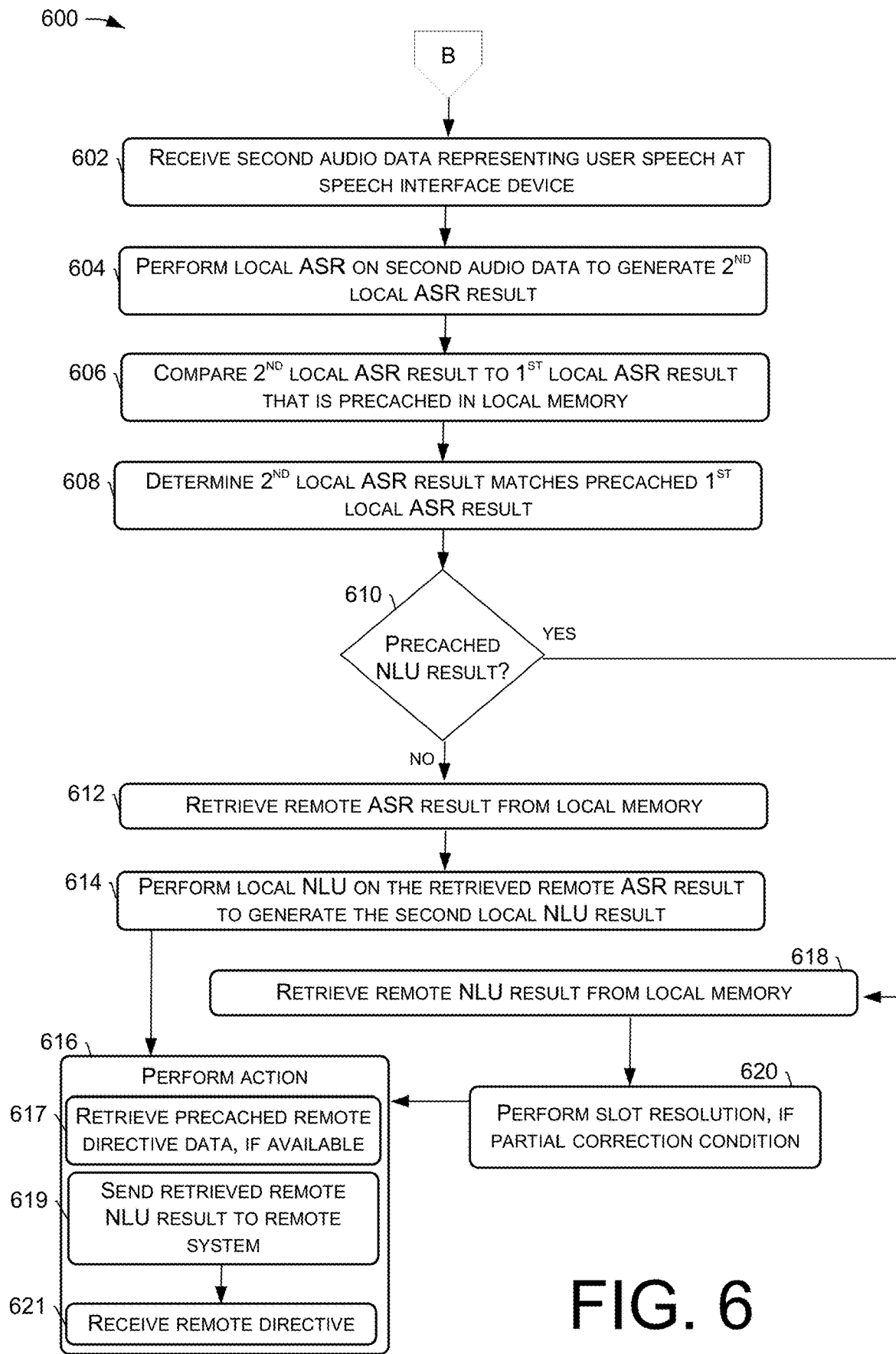
FIG. 6 is a flow diagram of an example process implemented by a hybrid speech interface device for using cached information for local speech processing.

FIG. 6 is a flow diagram of an example process 600 implemented by a hybrid speech interface device for using cached information for local speech processing. For discussion purposes, the process 600 is described with reference to the previous figures. Furthermore, the process 600 may proceed from either block 230 of the process 200, or block 424 of the process 400, as indicated by the off-page reference "B" in FIGS. 2, 4, and 6, where at least some remote speech processing information may be cached and available for use in responding to user speech.

At 602, the speech interface device may receive second audio data 116 that represents second user speech. In the example of FIGS. 1 and 3, this may be a time in the future when the user 106 utters the expression "Turn off the cellar light" and the remote ASR result 306 (e.g., "Turn off the cellar light") is already cached in local memory of the speech interface device 102. In some embodiments, the second audio data 116 may be received at a time when the remote system 104 is unavailable to the speech interface device 102 (e.g., when the Internet is down).

At 604, the local speech processing component 140 (e.g., the local ASR component 142) may perform ASR processing on the second audio data 116 to generate a second local ASR result. For example, the second local ASR result may be "Turn off the seller light", using the running example.

At 606, the caching component 148 may receive the second local ASR result from the local speech processing component 140 and may access the association data in the memory of the speech interface device 102 to compare the second local ASR result to cache entries of local ASR results, including, for example, the first local ASR result 302 shown in FIG. 3, and/or the first local ASR result 502 shown in FIG. 5.

At 608, the caching component 148 may determine that the second local ASR result matches the first local ASR result 302/502.

At 610, the caching component 148 may determine whether there is a cached remote NLU result, such as the remote NLU result 508 of FIG. 5, associated with the first local ASR result 502 that matches the second local ASR result. If there is no cached remote NLU result, but there is a cached remote ASR result 306 that is associated with the cached first local ASR result 302, the process 600 may follow the "NO" route from block 610 to block 612.

At 612, the caching component 148 may retrieve the remote ASR result 306 from the memory of the speech interface device 102 as a retrieved remote ASR result 306.

At 614, the local speech processing component 140 (e.g., the local NLU component 144) may perform NLU processing on the retrieved remote ASR result 306 to generate the second local NLU result 312 (as shown in FIG. 3).

At 616, the speech interface device 102 may perform an action, for a second time (because the first time the speech interface device 102 performed the action, it may not have had a cached remote ASR result to retrieve), based at least in part on the second local NLU result 312. In some embodiments, the action performed at block 616 may be based on local directive data generated by the local speech processing component 140 based on the second local NLU result 312.

If, at block 610, the caching component 148 determines, based on accessing the cache entries 150, that a remote NLU result 508 is stored in local memory and associated with the first local ASR result 502, the process 600 may follow the "YES" route from block 610 to block 618.

At 618, the caching component 148 may retrieve the remote NLU result 508 from the memory of the speech interface device 102 as a retrieved remote NLU result 508.

At 620, if the retrieved remote NLU result 508 was a partial correction that included an unresolved slot(s), the local speech processing component 140 (e.g., the local NLU component 144) may perform slot resolution to resolve the slot(s) with second text.

At 616, following block 620 (or following block 618 if there are no unresolved slots in the retrieved remote NLU result 508), the action may be performed at block 616, this time, the action being based at least in part on the retrieved remote NLU result 508, and possibly the retrieved remote NLU result 508 with a slot(s) resolved locally (e.g., with second text for the slot(s) generated by the local speech processing component 140).

As shown by sub-block 617, in some embodiments, if remote directive data 510 is cached and is associated with the first local ASR result 502, the remote directive data 510 may be retrieved (sub-block 617) from the memory of the speech interface device 102 as retrieved remote directive data 510, and at block 616, the action may be performed based on the retrieved remote directive data 510. In some embodiments, retrieving the remote directive data 510 includes retrieving a static response (e.g., content) from the memory of the speech interface device 102, and outputting the static response (e.g., content) via an output device 112 of the speech interface device 102 (e.g., using the static skill handler 152).

As shown by sub-blocks 619 and 621, in some embodiments, if the speech interface device 102 determines that the retrieved remote NLU result 508 is not executable on the speech interface device, the speech interface device 102 may send (sub-block 619) the retrieved remote NLU result 508 to the remote system 104, which may execute on the retrieved remote NLU result 508 to generate second remote directive data, and the speech interface device 102 may receive the second remote directive data from the remote system 102 to perform the action based on the second remote directive data. This allows for "partial outage protection" because if the remote speech processing system 120 is unavailable to the speech interface device 102, yet the remote system 104 is still available to execute on an intent, the speech interface device 102 may send the retrieved remote NLU result 508 to the remote system 104, whose other components (e.g., components other than the remote speech processing system 120) may be available.

Figure 7:
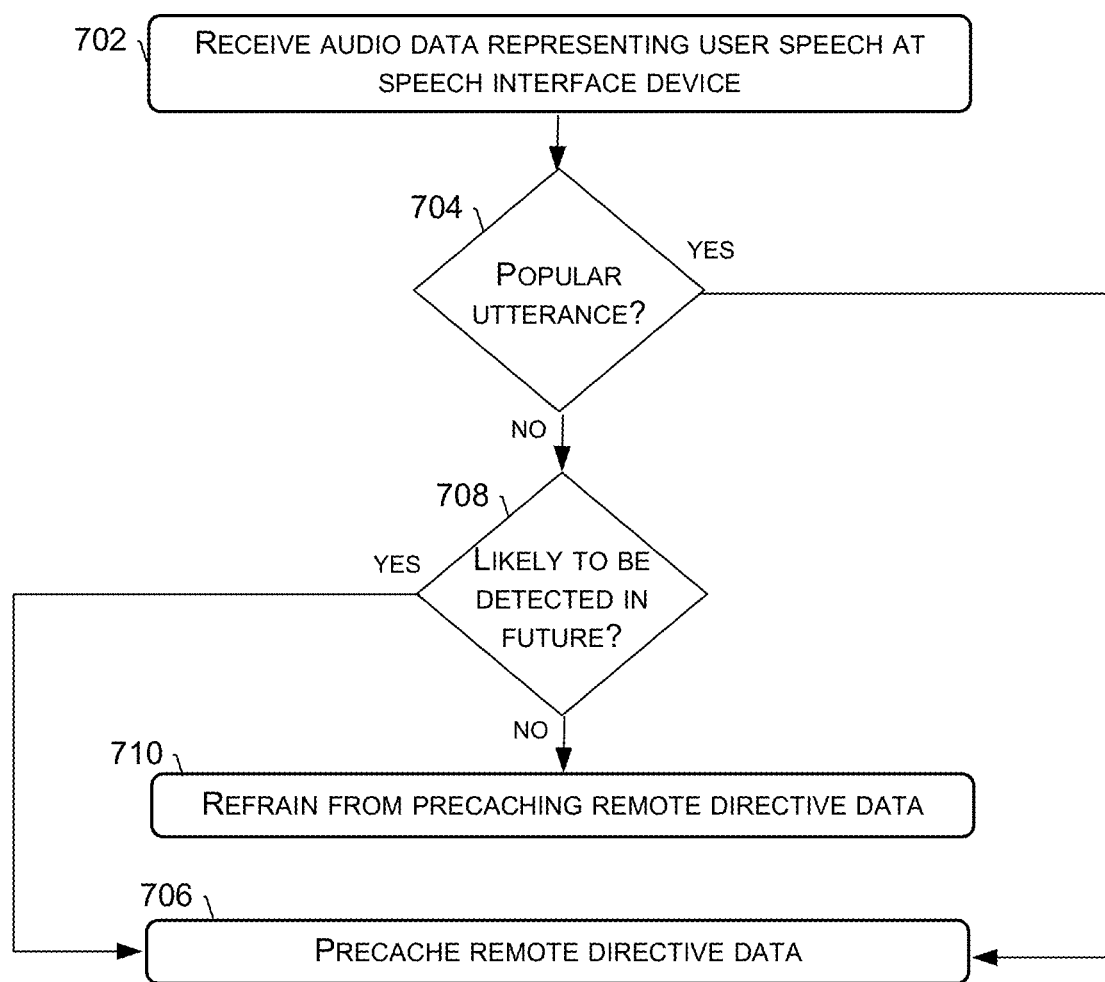
FIG. 7 is a flow diagram of an example process implemented by a hybrid speech interface device for selectively cached remote directive data based on popularity of an utterance or a likelihood of detected the utterance in the future.

FIG. 7 is a flow diagram of an example process 700 implemented by a hybrid speech interface device 102 for selectively cached remote directive data based on popularity of an utterance or a likelihood of detected the utterance in the future. For discussion purposes, the process 700 is described with reference to the previous figures.

At 702, the speech interface device 102 may receive audio data 116 that represents user speech.

At 704, the caching component 148 may determine whether the audio data 116 corresponds to an utterance that has been detected more than a threshold number of times, or above a threshold frequency, for a user account that is associated with the speech interface device 102. In other words, the determination at block 704 is to determine if the utterance is "popular" in that the user 106 has expressed the utterance often in the past. This determination at block 704 may be based on a history of past utterances associated with the user account, which may be maintained in the local memory of the speech interface device 102 (e.g., in the cache entries 150). If, at block 704, the caching component 148 determines that the audio data 116 corresponds to an utterance that has been detected more than a threshold number of times, or above a threshold frequency, for a user account that is associated with the speech interface device 102, the process 700 may follow the "YES" route from block 704 to block 706, where the caching component 148 may cache remote directive data corresponding to the utterance. For example, in the context of the process 200, the remote directive data received at block 208 may be cached if it is cacheable (as indicated by a cacheable status indicator), and if it is determined to correspond to a popular utterance at 704 of the process 700. If, at block 704, the caching component 148 determines that the audio data 116 corresponds to an utterance that has not been detected more than a threshold number of times, or above a threshold frequency, for a user account that is associated with the speech interface device 102 (e.g., an unpopular utterance), the process 700 may follow the "NO" route from block 704 to block 708.

At 708, the caching component 148 may determine whether a probability that the utterance will be detected in the future for a user account that is associated with the speech interface device 102 meets or exceeds a threshold probability. This determination at block 708 may be based on a history of past utterances associated with the user account, and may utilize machine learning to make a prediction as to whether there is a high likelihood that the utterance will be spoken again in the future. If, at block 708, the caching component 148 determines that a probability that the utterance will be detected in the future for a user account that is associated with the speech interface device 102 meets or exceeds a threshold probability, the process 700 may follow the "YES" route from block 708 to block 706, where the caching component 148 may cache remote directive data corresponding to the utterance. If, at block 708, the caching component 148 determines that a probability that the utterance will be detected in the future for a user account that is associated with the speech interface device 102 is less than a threshold probability, the process 700 may follow the "NO" route from block 708 to block 710 where the caching component 148 may refrain from caching remote directive data corresponding to the utterance.

Figure 8:
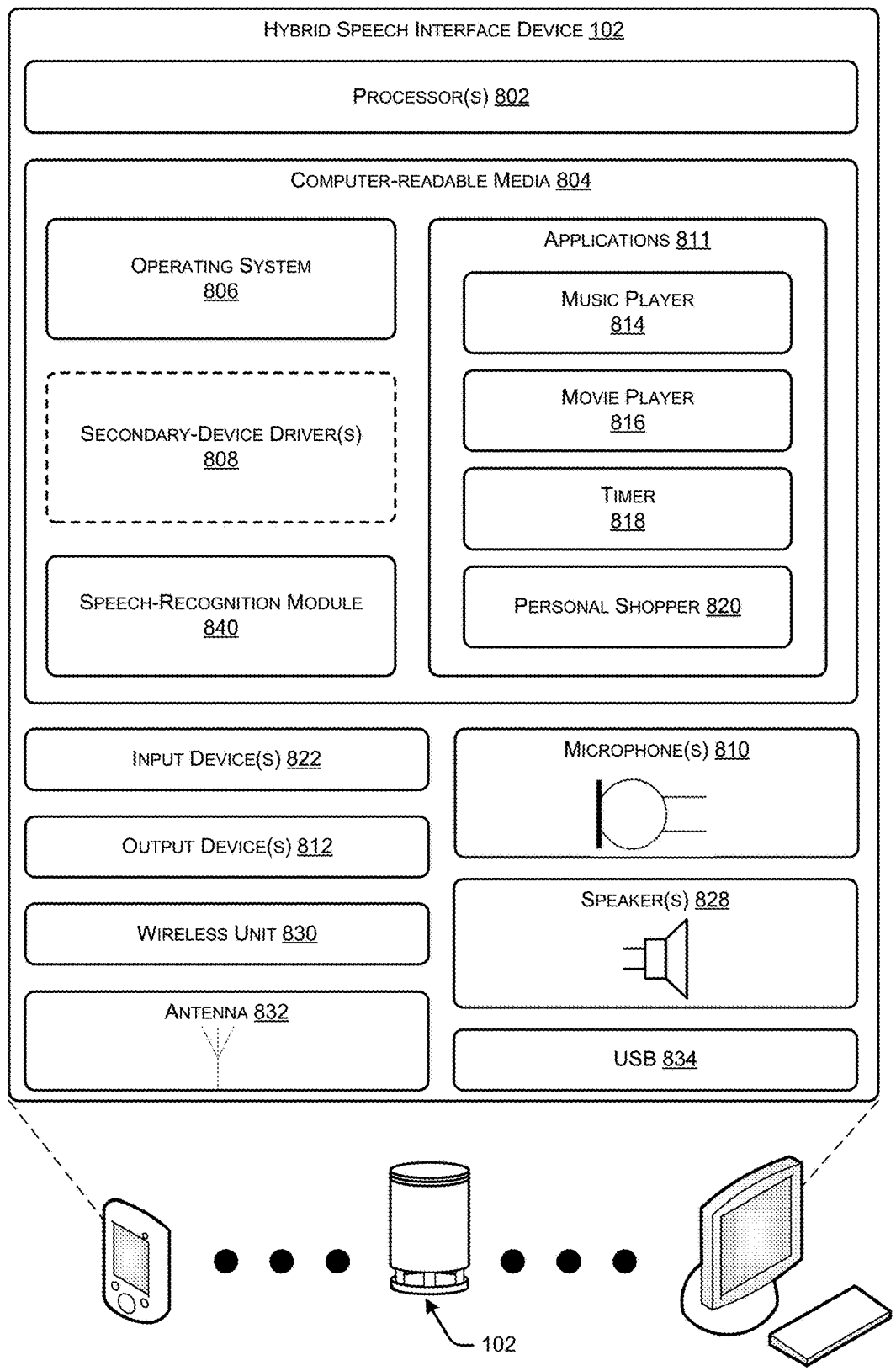
FIG. 8 illustrates example components of an electronic device, such as the hybrid speech interface device of FIG. 1.

FIG. 8 illustrates example components of an electronic device, such as the hybrid speech interface device 102 of FIG. 1. The speech interface device 102 may be implemented as a standalone device that is relatively simple in terms of functional capabilities with limited input/output components, memory, and processing capabilities. For instance, the speech interface device 102 does not have a keyboard, keypad, or other form of mechanical input. Nor does it have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 802 and computer-readable media 804. In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems.

The computer-readable media 804 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 804 may be implemented as computer-readable storage media ("CRSM"), which may be any available physical media accessible by the processor(s) 802 to execute instructions stored on the memory 804. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 802.

Several modules such as instruction, datastores, and so forth may be stored within the computer-readable media 804 and configured to execute on the processor(s) 802. A few example functional modules are shown as applications stored in the computer-readable media 804 and executed on the processor(s) 802, although the same functionality may alternatively be implemented in hardware, firmware, or as a system on a chip (SOC). At least some of the components shown in FIG. 1 may also be stored in the computer-readable media 804 and executable by the processor(s) 802 to implement the functionality described herein. For example, the voice services component 124, the hybrid request selector 128 and the local speech processing component 140, the caching component 148, as well as their subcomponents, may be stored in the computer-readable media 804 and executable by the processor(s) 802 to implement the functionality described herein.

An operating system module 806 may be configured to manage hardware within and coupled to the speech interface device 102 for the benefit of other modules. In addition, in some instances the speech interface device 102 may include some or all of one or more secondary-device drivers 808. In other instances, meanwhile, the speech interface device 102 may be free from the drivers 808 for interacting with second devices. The speech interface device 102 may further including, in some instances, a speech-recognition module 840, which may correspond to the local speech processing component 140 described with reference to FIG. 1.

The speech interface device 102 may also include a plurality of applications 811 stored in the computer-readable media 804 or otherwise accessible to the speech interface device 102. In this implementation, the applications 811 are a music player 814, a movie player 816, a timer 818, and a personal shopper 820. However, the speech interface device 102 may include any number or type of applications and is not limited to the specific examples shown here. The music player 814 may be configured to play songs or other audio files. The movie player 816 may be configured to play movies or other audio visual media. The timer 818 may be configured to provide the functions of a simple timing device and clock. The personal shopper 820 may be configured to assist a user in purchasing items from web-based merchants. When implementing the "hybrid" functionality described herein where a remote system 104 is unavailable to the speech interface device 102, these applications 811 may be configured to access local resources (e.g., local music or movie libraries, a local shopping list, a local calendar, etc.). In some cases, changes made to these local resources may be synched with remote versions of those resources when the remote system 104 subsequently becomes available to the speech interface device 102.

Generally, the speech interface device 102 has input devices 822 and output devices 812. The input devices 822 may include, without limitation, a keyboard, keypad, mouse, touch screen, joystick, control buttons, etc. In some implementations, one or more microphones 810, which may be similar to the microphone(s) 110 of FIG. 1, may function as input devices 822 to receive audio input, such as user voice input. The output device(s) 812 may be similar to the output device(s) 112 of FIG. 1, and may include, without limitation, a display(s), a light element (e.g., LED), a vibrator to create haptic sensations, or the like. In some implementations, one or more speakers 828 may function as output devices 812 to output audio sounds (e.g., audio content, TTS responses, tones at various frequencies, etc.).

A user 106 may interact with the speech interface device 102 by speaking to it, and the one or more microphone(s) 810 captures the user's speech. The speech interface device 102 can communicate back to the user 106 by emitting audible statements through the speaker 828. In this manner, the user 106 can interact with the speech interface device 102 solely through speech, without use of a keyboard or display.

The speech interface device 102 may further include a wireless unit 830 coupled to an antenna 832 to facilitate a wireless connection to a network. The wireless unit 830 may implement one or more of various wireless and/or IoT technologies, such as Bluetooth® protocol, Bluetooth Low Energy (BLE) protocol, ZigBee® protocol, Z-Wave® protocol, WiFi protocol, and/or any other type of protocol usable to communicate wirelessly between electronic devices in an environment, including those that do and/or do not rely data transmission over the wide area network 118. As such, the speech interface device 102 may be configure to act as a hub that can communicate with second devices in the environment and control the second devices, such as by using protocol stacks, drivers, and adapters to communicate over a suitable communications protocol. A USB port 834 may further be provided as part of the speech interface device 102 to facilitate a wired connection to a network, or a plug-in network device that communicates with other wireless networks. In addition to the USB port 834, or as an alternative thereto, other forms of wired connections may be employed, such as a broadband connection, Transmission Control Protocol/Internet Protocol (TCP/IP) protocol connection, etc. The communications interface 114 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 810. Further, there may be no output such as a display for text or graphical output. The speaker(s) 828 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    receiving, by a device, data that was selected based at least in part on a history of previous interactions with the device, wherein the data includes an identifier of an application that is executable by the device; and
    storing, based at least in part on determining that a probability that an utterance associated with the data will be detected by the device satisfies a threshold probability, the data in memory of the device.

2. The method of claim 1, further comprising:
    receiving, by the device, audio data that represents user speech;
    performing natural language understanding (NLU) processing using the audio data to generate intent data indicating an intent associated with the audio data; and
    performing, by the device and using the data, an action based at least in part on the intent data.

3. The method of claim 2, further comprising:
    performing automatic speech recognition (ASR) processing on the audio data to generate text data, wherein the performing the NLU processing comprises performing the NLU processing on the text data.

4. The method of claim 2, wherein:
    the data further includes text data representing the previous interactions as transcribed into text; and
    the performing the NLU processing further comprises performing the NLU processing on the text data to generate the intent data.

5. The method of claim 2, wherein the data further includes a model trained by one or more remote components, and wherein performing the NLU processing comprises performing the NLU processing on the audio data using the model.

6. The method of claim 1, wherein the data is associated with an utterance that was detected by the device in a previous interaction of the previous interactions.

7. The method of claim 1, wherein the data is used to identify a second device collocated in an environment with the device, and further comprising:
    sending a command to the second device, the command instructing an action to be performed at the second device.

8. The method of claim 1, wherein each of the previous interactions comprises an interaction where a previous utterance is spoken in an environment of the device and a microphone of the device generates respective audio data representing the previous utterance.

9. The method of claim 1, wherein the data is associated with a previous utterance that was detected by a second device in a previous interaction of the previous interactions, wherein the second device collocated in an environment with the device.

10. A device comprising:
    one or more processors; and
    memory storing computer-executable instructions that, when executed by the one or more processors, cause the device to:
        receive data selected based at least in part on a history of previous interactions with the device, wherein the data includes an identifier of an application that is executable by the device; and
        store, based at least in part on determining that an utterance associated with the data that is detected by the device satisfies a threshold number of times or satisfies a threshold frequency, the data in the memory.

11. The device of claim 10, wherein the instructions, when executed by the one or more processors, further cause the device to:
    receive audio data that represents user speech;
    analyze the audio data to generate intent data indicating an intent associated with the audio data representing the user speech; and
    perform, using the data, an action based at least in part on the intent data.

12. The device of claim 11, wherein analyzing the audio data comprises performing natural language understanding (NLU) processing.

13. The device of claim 12, wherein the data further includes a model trained by a remote component, and wherein the performing the NLU processing comprises performing the NLU processing using the model.

14. The device of claim 12, wherein:
    the data further includes text data representing previous interactions transcribed into text; and
    performing the NLU processing further comprises performing the NLU processing on the text data to determine intent data.

15. The device of claim 10, wherein the data is used to identify a second device collocated in an environment with the device.

16. The device of claim 10, wherein the data is used to identify content that is to be output via an output device of the device.

17. The device of claim 10, wherein the data is associated with an utterance that was detected by the device in a previous interaction of the previous interactions.

18. The device of claim 10, wherein the data is used to identify a second device collocated in an environment with the device, and wherein the instructions, when executed by the one or more processors, further cause the device to:
    send a command to the second device, the command instructing an action to be performed at the second device.

19. The device of claim 10, further comprising a microphone, wherein each of the previous interactions comprises a previous interaction where a previous utterance is spoken in an environment of the device and the microphone generates respective audio data representing the previous utterance.

20. The device of claim 10, wherein the data is associated with a previous utterance that was detected by a second device in a previous interaction of the previous interactions, wherein the second device collocated in an environment with the device.

* * * * *